(No Model.)

A. C. FAIRBANKS.
RIM FOR BICYCLE WHEELS.

No. 537,188. Patented Apr. 9, 1895.

WITNESSES:

INVENTOR:

UNITED STATES PATENT OFFICE.

ALBERT C. FAIRBANKS, OF SOMERVILLE, MASSACHUSETTS.

RIM FOR BICYCLE-WHEELS.

SPECIFICATION forming part of Letters Patent No. 537,188, dated April 9, 1895.

Application filed October 24, 1893. Serial No. 489,016. (No model.)

*To all whom it may concern:*

Be it known that I, ALBERT C. FAIRBANKS, of Somerville, in the county of Middlesex and State of Massachusetts, have invented certain new and useful Improvements in Rims for Bicycle-Wheels, of which the following is a specification.

The present invention relates to wooden rims for bicycle wheels, and is an improvement on the type of rim shown and described in Patent No. 496,971, granted May 9, 1893, which is composed of plies of wood. While a rim of this character is known to possess numerous advantages, yet it has been found that when made in certain forms it has not sufficient inherent strength to withstand the strain to which it is subjected. Moreover, the character of the material of which the rim is formed is such that exposure to the elements is disastrous, and contact with foreign substances is likely to detract from the appearance of the rim.

The object of my invention therefore is to provide means for strengthening and preserving and protecting a rim of the character above mentioned, so as to prolong its life and maintain a sightly appearance of it.

With the above ends in view the invention contemplates enveloping the rim in a sheath or covering formed of a continuous sheet of fabric cut or formed so as to have the warp and the woof extend diagonally of the rim and resist lateral and longitudinal strains to which the latter may be subjected and prevent separation of the plies of wood of which the rim is composed, the said sheet being fastened all over the rim. This covering or sheath is designed to be waterproof, and besides strengthening the rim, it serves to protect the same.

The accompanying drawings which form part of this specification illustrate an embodiment of the invention.

Figure 1:
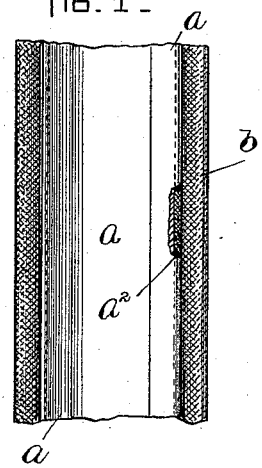
Figure 2:
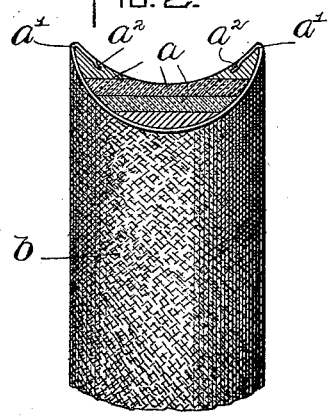
Figure 4:
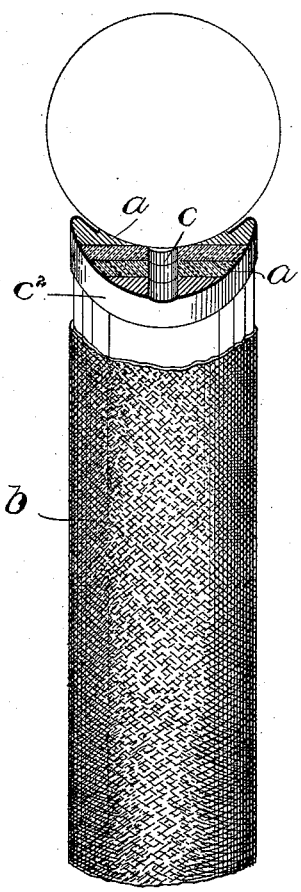
Figure 3:
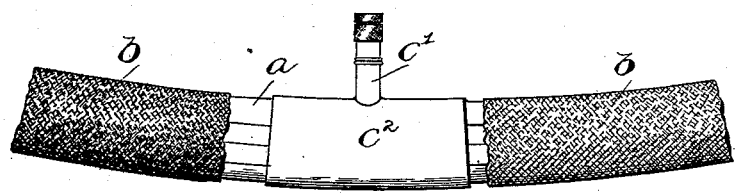

Figure 1 shows a face view of a portion of a rim constructed in accordance with the invention, and represented as broken out at one part. Fig. 2 shows a cross-section of the rim. Fig. 3 shows a side view of a portion of the rim with the covering partly broken away. Fig. 4 shows a cross-section taken at the place where the charging nipple is applied to the tire.

The letter, $a$, designates the plies of wood composing the concavo-convex rim, and which are cemented together with their grains running in different directions. A sheet, $b$, of a suitable kind of woven fabric as canvas is applied to this rim, and stretched closely over the convex inner side of the rim and carried over the edges, $a'$, formed by the meeting of the convex and concave surfaces, and upon the concave outer side of the rim where it is or may be secured by inserting its edges in slits, $a^2$, formed in the outer wood ply.

The canvas sheet is cut or formed, so that its warp and woof extend diagonally of the rim, and both will resist lateral strain tending to flatten the rim or separate its laminæ, and will also resist longitudinal strain.

The canvas covering is secured all over the rim by cementing it thereto, and the cement and canvas together form a waterproof sheath which preserves the rim. At the place where an opening, $c$, is made in the rim to receive the nipple, $c'$, to which the air-pump is connected when charging the tire, a metallic clip, $c^2$, is sprung over the rim to reinforce the wood around the hole.

Having thus described a way of embodying my invention, what I claim as new is as follows:

A concavo-convex wooden wheel rim composed of layers secured together, and a waterproof fabric sheath inclosing said rim cemented thereon, with its warp and woof extending diagonally of the rim substantially as and for the purpose described.

In testimony whereof I have signed my name to this specification, in the presence of two subscribing witnesses, this 16th day of October, A. D. 1893.

ALBERT C. FAIRBANKS.

Witnesses:
A. D. HARRISON,
ARTHUR W. CROSSLEY.